United States Patent [19]

Uzawa et al.

[11] 4,288,799

[45] Sep. 8, 1981

[54] LIQUID JET RECORDING HEAD WITH PERMANENT JIG ALIGNMENT

[75] Inventors: Shunichi Uzawa, Naka; Shigeyuki Matsumoto; Minoru Miyazaki, both of Kawasaki; Akio Iijima, Yokohama; Kunio Watanabe, Kawasaki, all of Japan

[73] Assignee: Canon Kabushiki Kaisha, Tokyo, Japan

[21] Appl. No.: 148,269

[22] Filed: May 9, 1980

[30] Foreign Application Priority Data

May 14, 1979 [JP] Japan .................................. 54-58977

[51] Int. Cl.[3] ............................................ G01D 15/18

[52] U.S. Cl. ............................................ 346/140 R

[58] Field of Search ........................... 346/75, 140 PD

[56] References Cited

U.S. PATENT DOCUMENTS

| | | | |
|---|---|---|---|
| 3,580,515 | 5/1971 | Cassill | 346/75 X |
| 3,693,179 | 9/1972 | Skala | 346/140 PD X |
| 4,223,320 | 9/1980 | Paranjpe et al. | 346/75 |
| 4,231,048 | 10/1980 | Horike et al. | 346/140 PD |

*Primary Examiner*—George H. Miller, Jr.

*Attorney, Agent, or Firm*—Fitzpatrick, Cella, Harper & Scinto

[57] ABSTRACT

A liquid jet recording head used for a liquid jet recording device conducting recording by projecting a liquid droplet to a predetermined direction comprises recording head elements each of which comprises an inflow port side end portion having an inflow port for the liquid, an ejecting orifice side end portion having an ejecting orifice for ejecting the liquid at the end, a pressure generating portion existing between the inflow port side end portion and the ejecting orifice side end portion and communicating with them, and an electromechanical transducer connected to the pressure generating portion and capable of changing the inner pressure of the liquid in the pressure generating portion; and a jig comprising grooves for fixing the recording head elements and electric contacts for applying electric signals to the electromechanical transducer, the recording head element being pressed from two directions to be fixed to the groove and an electric contact being established between the electromechanical transducer and the jig.

6 Claims, 6 Drawing Figures

LIQUID JET RECORDING HEAD WITH PERMANENT JIG ALIGNMENT

BACKGROUND OF THE INVENTION

1. Field of the Invention

The present invention relates to a liquid jet recording head used for a device for recording by ejecting and projecting a recording liquid, so-called ink, and more particularly, to a liquid jet recording head used for a liquid jet recording device capable of stable recording continuously ranging from a super high speed to a low speed.

2. Description of the Prior Art

Non-impact recording processes have recently drawn attention since the noise accompanying recording operation is negligibly small.

Among them, an ink jet recording process (liquid jet recording processes) which can effect a high speed recording and can record on plain paper without fixation are very powerful processes. Heretofore, a wide variety of systems and apparatuses therefore have been proposed. Some of them have been practically operated while others are now under development.

Such ink jet recording device (liquid jet recording device) ejects a recording liquid, so-called ink, from an ejecting orifice provided at a recording head and projects the droplets toward a record member and the droplets impinge on the record member to effect recording.

Such recording device may be constituted in various ways depending upon the recording mode applied thereto. Anyway, the principle of the method for ejecting and projecting the recording liquid is simple and can be used for high speed recording. One of the effective recording devices utilizing such method is a device in which a recording liquid is ejected and projected by applying an electric signal to an electromechanical transducer provided on the recording head resulting in mechanical deformation thereof. This is disclosed in detail, for example, in U.S. Pat. No. 3,683,212.

The principle of projecting liquid droplets by the recording device disclosed in U.S. Pat. No. 3,683,212 is that electric impulses (electric signals) are applied to a cylindrical electromechanical transducer mounted on the recording head through a lead electrode to cause a change of the inner diameter of the transducer in a pulsating manner resulting in a change in the volume of the pressure generating portion. The ejected droplets impinge on a record member. A volume of the recording liquid corresponding to the volume of the recording liquid thus ejected is supplied through an inflow conduit communicating with the pressure generating portion when the volume of the pressure generating portion returns to the original one.

Such recording head can continuously and stably effect recording only when the maximum frequency of generating droplet is at most several tens of KHz and therefore, the high speed recording by using one piece of such recording head is limited to a great extent. A solution to this problem is that a plurality of such recording heads are arranged to improve the maximum recording frequency resulting in a substantially high speed recording. In such case, it is necessary for increasing the resolution that positioning of each recording head in the array is accurate to a great extent. For example, usual images of good quality require a resolution as high as 10 pel/mm. In this case, the positioning of each recording head should be effected at an accuracy of 1/10 mm or at a higher accuracy. These are remarkable disadvantageous for productivity and mass production and disturb commercial production.

The above mentioned drawbacks increase in a geometrical progression as the number of the arranged recording heads increase, and as the result, yield of production of the recording head decreases to a great extent. The more the number of the recording heads to which a lead electrode is to be connected, the more complicated the wiring of lead electrodes for input signals. Further, the electrical insulation among the lead electrodes should be taken into consideration.

The electromechanical transducer of the above mentioned recording head is fixed, with adhesives, to the outer peripheral surface of a cylinder member made of glass or the like having an ejecting orifice at the tip. At present the accuracy of shape and dimension of electromechanical transducers is at most about $\pm 10\ \mu m$, and therefore, when many recording heads are arranged to form a multiorifice system, it is fundamentally difficult to improve the accuracy of arrangement. As the result, recording devices capable of producing recorded images of high resolution according to the above system can not be easily manufactured and the mass production is difficult and the productivity is low.

SUMMARY OF THE INVENTION

An object of the present invention is to provide a liquid jet recording head free from the above mentioned disadvantages.

Another object of the present invention is to provide a liquid jet recording head comprising a plurality of recording head elements arranged according to a predetermined pattern with a very high accuracy.

A further object of the present invention is to provide a liquid jet recording head capable of ejecting droplets from the recording head element which impinge on the intended position of the surface of a record member.

Still another object of the present invention is to provide a liquid jet recording head of high productivity and suitable for mass production.

A still further object of the present invention is to provide a liquid jet recording head where the recording head elements are exactly arranged at desired intervals in an orderly manner.

Still another object of the present invention is to provide a liquid jet recording head where the ejecting direction is arranged with high accuracy.

A still further object of the present invention is to provide a liquid jet recording head suitable for a high speed recording with high resolution.

According to the present invention, there is provided a liquid jet recording head used for a liquid jet recording device conducting recording by projecting a liquid droplet to a predetermined direction which comprises: recording head elements each of which comprises an inflow port side end portion having an inflow port for the liquid, an ejecting orifice side end portion having an ejecting orifice for ejecting the liquid at the end, a pressure generating portion existing between the inflow port side end portion and the ejecting orifice side end portion and communicating with them, and an electromechanical transducer connected to the pressure generating portion and capable of changing the inner pressure of the liquid in the pressure generating portion; and a jig comprising grooves for fixing the recording head elements and electric contacts for applying electric signals to the electromechanical transducer, the recording head element being pressed from two directions to be fixed to the groove and an electric contact being established between the electromechanical transducer and the jig.

DESCRIPTION OF THE PREFERRED EMBODIMENTS

Figure 1:
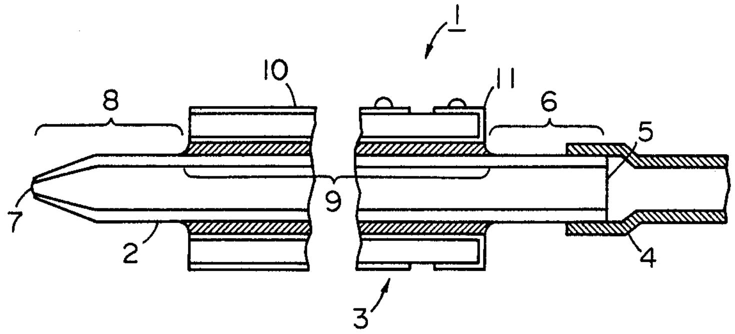
FIG. 1 is a schematical cross sectional view of an embodiment of a recording head element constituting a recording head according to the present invention.

Referring to FIG. 1, the structure and characteristics of a preferable recording head element 1 according to the present invention are described in detail.

Recording head element 1 comprises a cylindrical member 2 having a substantially fluid-dynamically smooth inside wall and composed of a material of relatively high hardness and a cylindrical electromechanical transducer 3 fixed around the cylindrical member 2. Cylindrical member 2 comprises usually an inflow port side end portion 6 having an inflow port 5 through which a liquid is supplied from an ink supply (not shown) provided at a place different from the recording head element 1, if desired, by way of a supplying conduit 4, an ejecting orifice side end portion 8 having an ejecting orifice 7 for ejecting the liquid existing in cylindrical member 2, and a pressure generating portion 9 present between the portion 6 and the portion 8.

The circular cross sectional area of the pressure generating portion 9 is almost constant along the whole length of pressure generating portion 9 while the circular cross sectional area of the ejecting orifice side end portion 8 gradually decreases starting from the side of the pressure generating portion 9 to the end and an ejecting orifice 7 is formed at the end. The circular cross section of the inflow port side end portion 6 is the same or almost the same as that of the pressure generating portion 9 along the whole length, and at the end there is formed an inflow port 5 which is positioned at a portion outside of the portion surrounded by the transducer 3. The cylindrical member 2 is provided with a supplying conduit 4 at the inflow port end portion. The conduit 4 leads a liquid supplied from the liquid supply to the pressure generating portion 9. The conduit 4 is made of a viscoelastic material such as polyvinyl chloride and the like, and its inner diameter is smaller than the outer diameter of cylindrical member 2. One end of the conduit 4 is expanded and at least a part of the end portion of inflow port side end portion 6 is inserted into said expanded portion of conduit 4 and the outer periphery of the inserted end portion of the portion 6 is tightened by the conduit 4.

Electromechanical transducer 3 covers at least a part of pressure generating portion 9 and is fixed around the cylindrical member 2 in substantially stress transmitting engagement with the liquid in the portion 9 so as to supply effectively pulsewise pressure waves to the liquid existing in the pressure generating portion 9.

The transducer is provided with an external surface electrode layer 10 at the outer wall surface and an internal surface electrode layer 11 at the inner wall surface. By these electrodes there is supplied the electric impulse which causes pulsewise change in the volume of pressure generating portion 9 to eject and project the liquid droplets through the ejecting orifice 7. The internal surface electrode 11 is extended at the side of the portion 6 to the side where the external surface electrode 10 is present, so as to facilitate the electrical connection.

The recording head according to the present invention is constituted in such a manner that recording head elements (for example, as illustrated in FIG. 1) are fixed to a jig having grooves for fixing the elements and electric contacts through which electric signals are applied to the electromechanical transducer.

Figure 2A:
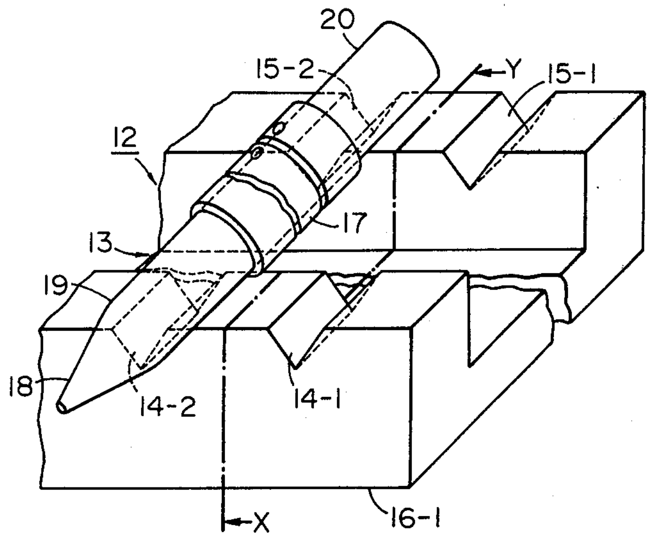
FIG. 2A is a schematical oblique view of a part of a recording head according to the present invention.

Referring to FIG. 2A, only one recording head is shown and others are omitted for the purpose of simplicity.

A recording head 12 is provided with a recording head element 13 of the same structure as that shown in FIG. 1. The element 13 is disposed, with high accuracy, in V-shaped grooves 14-2 and 15-2 of a jig 16-1 which have a predetermined shape and predetermined dimensions and are positioned at a predetermined position, and another recording head element (not shown) is positioned in V-shaped grooves 14-1 and 15-1 in the same way.

According to the present invention, dimensions and shape of jig 16-1 and dimensions and positions of the V-shaped grooves are of high accuracy in order to form a structure in which the recording head elements are arranged with a high positional accuracy by positioning the recording head elements on the jig 16-1 with high accuracy.

Such high accuracy principally depends on the processing accuracy of the jig 16-1, and at present, said processing accuracy of the jig 16-1 is improved to a great extent and the productivity is also good, and therefore, it is possible to produce such jig which can sufficiently satisfy the recording accuracy required for the recording head. Further, according to the present invention, the recording head element 13 is fixed to the jig 16 in such a manner that the electromechanical transducer 17 mounted on the recording head element 13 is positioned in the central recess of the jig 16-1 and the ejecting orifice side end portion 19 and the inflow port side end portion 20 of the cylindrical member 18 are positioned in the V-shaped groove 14-2 and the V-shaped groove 15-2, respectively. Therefore, as far as the recording head element 13 is concerned, the accuracy of positioning the element 13 exclusively depends on the processing accuracy of the cylindrical member 18. As the result, the recording head thus constructed can give a record of high resolution and moreover, the processing and assembling are easy and good from the viewpoints of productivity and mass production.

Figure 2B:
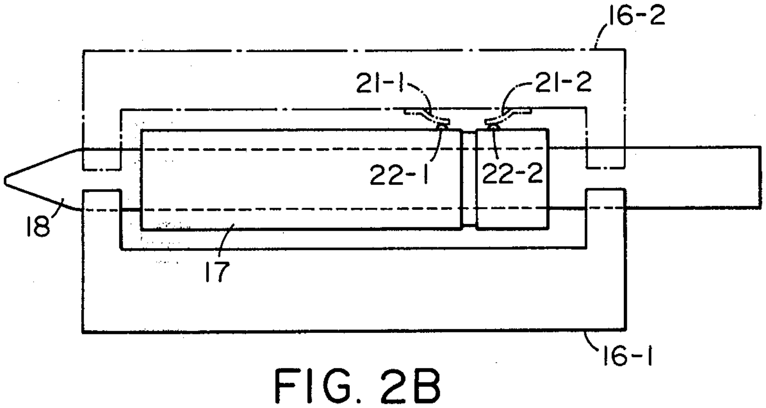
FIG. 2B is a cross sectional view taken along the dot and dash line X-Y in FIG. 2A.

Referring to FIG. 2B, the recording head element 13 is positioned on the jig 16-1 as in FIG. 2A. The element 13 is fixed between jig 16-1 and jig 16-2 along the V-shaped groove by uniformly pressing the jig 16-2 (shown by an imaginary line) onto the element 13 such that the jig 16-2 covers the element 13. The jig 16-2 has a structure similar to the jig 16-1.

Inside surface of the jig 16-2 is provided with lead electrodes for applying electric signals to the electromechanical transducer 17 of the recording head element 13. The lead electrodes are in the form of a printed circuit produced by a conventional method. The jig 16-2 is pressed onto the recording head element 13 to form electrical connection between contacts 21-1 and 21-2 electrically connected with lead electrodes and contacts 22-1 and 22-2 of the transducer 17, respectively. The recording head element 13 may be fixed to jigs 16-1 and 16-2 by using an adhesive such as an epoxy adhesive and pressing jigs 16-1 and 16-2 onto the element 13. Or, the element 13 may be fixed firmly be using tightening means at both ends of jigs 16-1 and 16-2.

Figure 3:
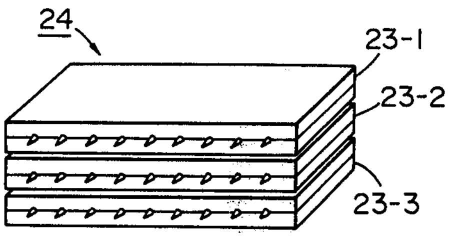
FIG. 3 is a schematical oblique view of an embodiment of the recording head according to the present invention.

Referring to FIG. 3, there is illustrated an array type recording head 24 where 9 pieces of recording head element are arranged in parallel to form a recording head unit 23 and the three units are piled.

If desired, a spacer of a predetermined thickness may be inserted between the units so as to arrange the recording head element groups at a desired space.

Figure 4:
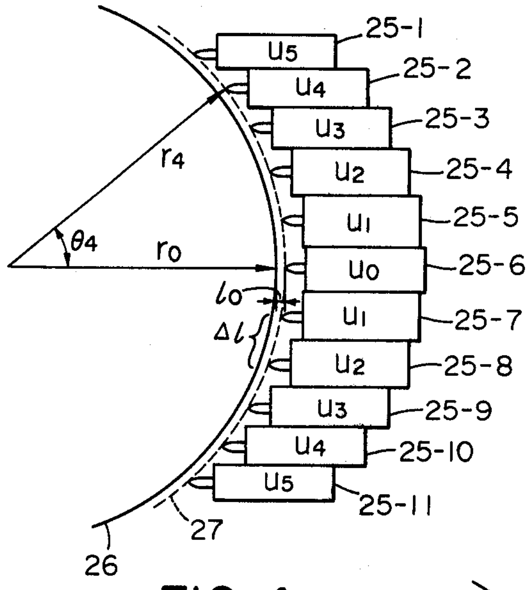
FIG. 4 and FIG. 5 show other preferred embodiments according to the present invention.
Figure 5:
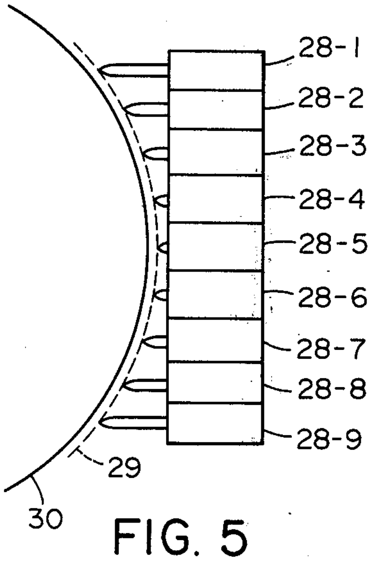

Referring to FIGS. 4 and 5, there are shown embodiments of the recording head according to the present invention where a record member such as paper is provided around a rotating drum.

In FIG. 4, recording head units 25 are piled in a form of stairs with a recording head unit 25-6 at the center. The ejecting orifices of the units are positioned on one and the same circumference at regular intervals.

The position represented by polar coordinate ($\gamma i$, $\theta i$) of ejecting orifice of unit Ui when the units are piled as above is determined by the following approximate formulas:

$$\theta i = \tan^{-1}[\gamma_o \sin(i \cdot \Delta\theta)/\{\gamma_o \cos(i \cdot \Delta\theta) + l_o\}]$$

$$\gamma i = \{\gamma_o \cos(i \cdot \Delta\theta) + l_o\}/\cos\theta i$$

where $\gamma_o$ is a radius of the drum 26, $l_o$ is the distance between the ejecting orifice and the surface of the record member (not shown) on drum 26, $\Delta\theta$ is a central angle subtended by $\Delta l$ and $\Delta l$ is a unit space between the positions of droplets ejected from the adjacent units and attached to the recording member.

One method of positioning the ejecting orifices of the units on one and the same circumference 27 is that, as shown in FIG. 4, unit 25-6 is placed at the middle and the thickness of the unit is made thinner as the unit is farther from said unit 25-6. Thus, the intended arrangement of recording head elements can be relatively easily produced.

In FIG. 4, each unit may contain one recording head element or a plurality of recording head elements arranged in a form of array. The position of ejecting orifice of the recording head elements may be optionally arranged in various ways such as a matrix-like arrangement, an arrangement capable of effecting an interlace recording as disclosed in U.S. Pat. No. 4,069,486, an arrangement of a zigzag form, and the like.

FIG. 5 shows another embodiment of the recording head of the present invention, and the length of the recording head element projected from the unit 28 constituting the recording head is adjusted so that the ejecting orifice is positioned on one and the same circumference 29 which is at a predetermined and constant distance from the surface of a record member (not shown) surrounding a drum 30.

In FIG. 5, the farther the unit is from the central unit 28-5, the longer the projected length of the recording head element. However, if the projected length is too long, the tip of the recording head element vibrates upon recording resulting in lowering the quality of record. Therefore, the recording head elements should be designed such that the projected length is not too long.

What we claim is:

1. A liquid jet recording head used for a liquid jet recording device conducting recording by projecting a liquid droplet to a predetermined direction which comprises:

recording head elements each of which comprises an inflow port side end portion having an inflow port for the liquid, an ejecting orifice side end portion having an ejecting orifice for ejecting the liquid at the end, a pressure generating portion existing between the inflow port side end portion and the ejecting orifice side end portion and communicating with them, and an electromechanical transducer connected to the pressure generating portion and capable of changing the inner pressure of the liquid in the pressure generating portion; and a jig comprising grooves for fixing the recording head elements and electric contacts for applying electric signals to the electromechanical transducer, the recording head element being pressed from two directions to be fixed to the groove and an electric contact being established between the electromechanical transducer and the jig.

2. A liquid jet recording head according to claim 1 in which the jig has a recess at the center portion where the electromechanical transducer is arranged.

3. A liquid jet recording head according to claim 1 in which the pressure generating portion is composed of a cylindrical member.

4. A liquid jet recording head according to claim 1 in which the electromechanical transducer is in the form of a cylinder.

5. A liquid jet recording head according to claim 1 in which a plurality of the recording head elements are fixed and set in array at regular intervals.

6. A liquid jet recording head according to claim 5 in which the ejecting orifices of recording head elements are positioned substantially on one and the same circumference.

* * * * *